United States Patent [19]

Smith, III

[11] 3,908,256

[45] Sept. 30, 1975

[54] METHOD OF MAKING A DEEP WELL SCREEN

[75] Inventor: Howard F. Smith, III, Houston, Tex.

[73] Assignee: Howard Smith Company, Houston, Tex.

[22] Filed: Sept. 24, 1973

[21] Appl. No.: 399,839

Related U.S. Application Data

[62] Division of Ser. No. 302,425, Oct. 31, 1972.

[52] U.S. Cl. ......... 29/163.5 CW; 29/471.1; 29/479; 166/233

[51] Int. Cl.² .......................................... B23P 15/16

[58] Field of Search .......... 29/163.5 CW, 163.5 R, 29/163.5 F, 478, 479, 482, 471.1; 140/92.2, 112; 166/231, 232, 233, 234, 227; 210/497.1

[56] References Cited
UNITED STATES PATENTS

| | | | |
|---|---|---|---|
| 979,748 | 12/1910 | Decker | 166/233 |
| 1,635,368 | 7/1927 | Layne | 29/163.5 CW |
| 1,715,856 | 6/1929 | McEvoy, Jr. | 29/163.5 CW |
| 1,808,913 | 6/1931 | Wilson | 29/163.5 CW |
| 1,878,432 | 9/1932 | Whann | 166/232 |
| 2,046,459 | 7/1936 | Johnson | 29/163.5 CW |
| 2,081,190 | 5/1937 | Wilson | 29/163,5 CW |
| 2,150,450 | 3/1939 | Maloney | 166/5 |
| 2,327,687 | 8/1943 | Williams et al | 29/163.5 CW |

*Primary Examiner*—Victor A. DiPalma
*Attorney, Agent, or Firm*—Pravel & Wilson

[57] ABSTRACT

Deep well screen and method of making same wherein a wire screen sleeve having longitudinal wires arranged in a generally cylindrical shape, with external wrapping wire welded thereto, is positioned over a perforated pipe having an external diameter substantially equal to the internal diameter of the sleeve, and wherein annular welds are provided between each end of said wire screen and said pipe to close the space therebetween at such ends and to secure the sleeve to the pipe without exceeding the external diameter of said wrapping wires.

5 Claims, 3 Drawing Figures

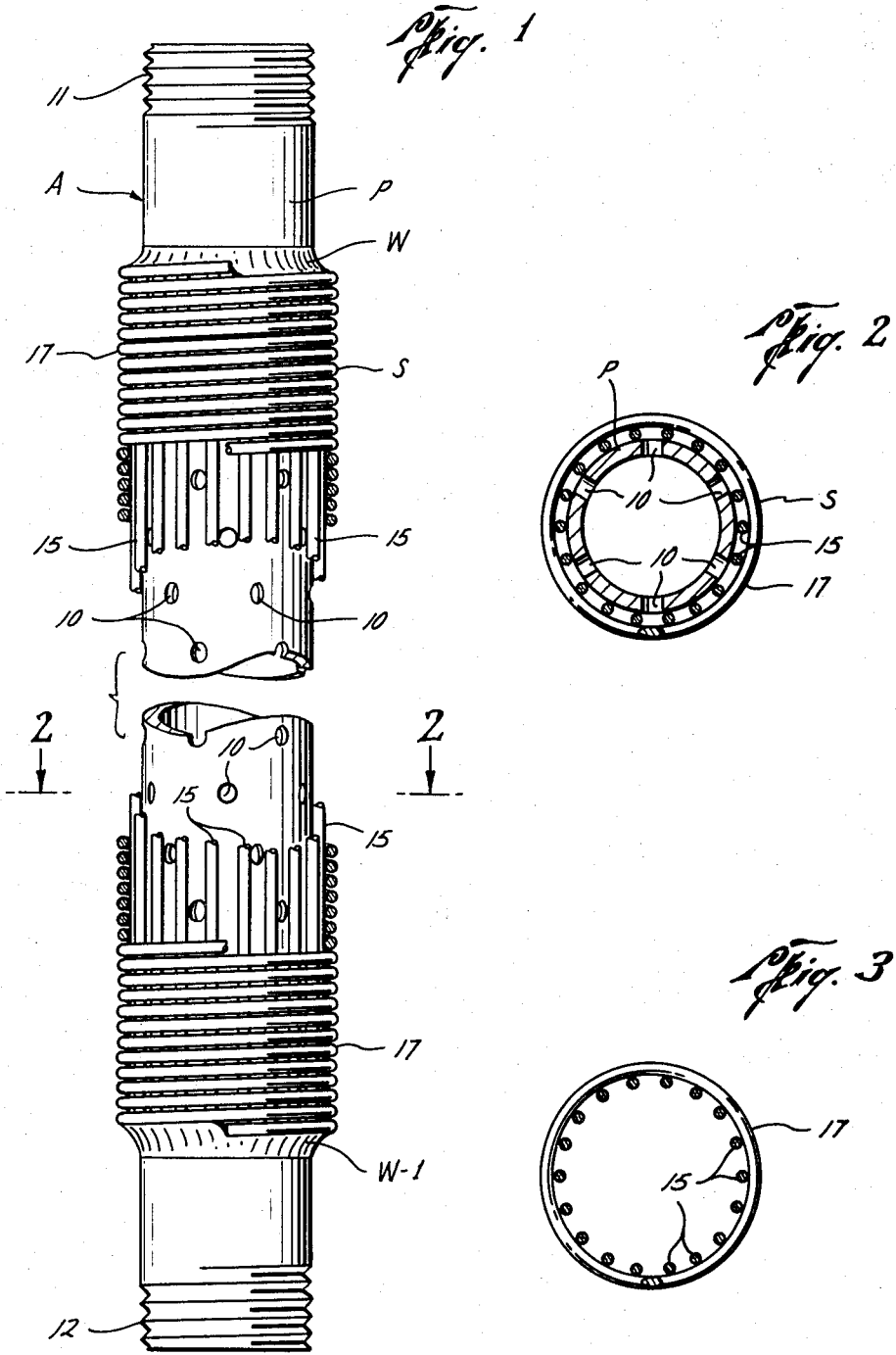

METHOD OF MAKING A DEEP WELL SCREEN

CROSS-REFERENCE TO RELATED APPLICATIONS

This application is a division of co-pending U.S. Pat. Application Ser. No. 302,425, filed Oct. 31, 1972.

BACKGROUND OF THE INVENTION

The field of this invention is well screens.

In the prior art, it has been customary to secure a wire screen sleeve on a perforated pipe with end retainer rings at each end of the sleeve. Such end retainer rings have an external diameter which is greater than the external diameter of the wire screen sleeve, thus requiring a larger bore size for such end rings to pass therethrough than would be required for the sleeve diameter itself. The prior art construction using such end rings has resulted in gaps between an end ring and the end of the external wire screen which has been sufficient to permit fluid cutting action by the well fluid flowing through such gaps. Further, such end rings do not prevent rotational movement of the sleeve relative to the pipe, and if a torque is applied to the pipe, the screen sleeve is subject to twisting out of one or both of the end rings, resulting in an exposure of an open end or ends of the screen sleeve. Also, when it becomes necessary to mill off the screen for a fishing job, after the upper end ring is milled off, it may be impossible to mill off the screen sleeve because it simply rotates with the milling tool. Stretching of the pipe is also apt to expose one or both ends of the screen sleeve since the end rings move with the pipe.

SUMMARY OF THE INVENTION

The present invention relates to a new and improved deep well screen and method of making same wherein the screen includes a wire screen sleeve made separately from a perforated pipe and then slipped over same and welded to the pipe by an annular weld at each end of the screen sleeve. The well screen of this invention is particularly suitable for use in deep oil and gas wells where the screen is subjected to high pressures, and it overcomes the aforesaid disadvantages of the prior art.

BRIEF DESCRIPTION OF THE DRAWING

FIG. 1 is an elevation of the well screen of this invention, with parts thereof removed for purposes of illustration;

FIG. 2 is a view taken on line 2-2 of FIG. 1; and

FIG. 3 is a view similar to FIG. 2, but illustrating the wire screen sleeve prior to positioning same on the perforated pipe to form the well screen of this invention.

DESCRIPTION OF THE PREFERRED EMBODIMENT

In the drawings, the letter A designates generally the well screen of this invention, which is made in accordance with the method of this invention. Briefly, the well screen A includes a perforated pipe P which has a wire screen sleeve unit S mounted thereon and welded thereto by annular end welds W and W-1.

Considering the invention more in detail, the pipe P is an ordinary well pipe, usually formed of steel, which has a plurality of holes or openings 10 formed therein to provide for fluid flow therethrough to the extent permitted by the screen sleeve S, as will be more evident hereinafter. The holes 10 which are illustrated are merely illustrative and may be arranged differently and may vary in number in accordance with the area needed for proper fluid flow through the pipe P. The pipe P preferably has threads 11 at its upper end and threads 12 at its lower end for connection in a tubing string which is adapted to be positioned in a well, generally in proximity to a well formation, as will be well understood by those skilled in the art.

The wire screen sleeve S is formed separately from the pipe P and is formed in any known manner with rib wires 15 extending longitudinally and being mounted or disposed in a generally tubular shape forming an internal diameter therewith which is equal to or slightly greater than the external diameter of the pipe P. Wire 17 is wrapped on the rib wires 15, preferably in a helical fashion as illustrated in the drawings, and the wires 17 are spaced apart from each other so as to provide predetermined fluid passages therebetween for the control of the fluid flow therethrough so that fluid may pass readily between the wires 17, while sand and other solids are prevented from flowing between the wires 17.

In the usual case, the wires 15 and 17 are formed of steel or other weldable material and they are welded together at each crossing point of the wires 17 and the rib wires 15 so that the screen S is a unitary assembly which is self-supporting prior to being placed upon the pipe P (FIG. 3). The wires 15 are circumferentially spaced with respect to each other and the spacing is preferably large enough so that none of the holes 10 are covered by the wires 15.

After the screen S has thus been formed in the conventional manner, it is then slipped over the pipe P so as to cover the perforated section of the pipe P. It will be appreciated that the entire pipe P may be perforated, or only a portion thereof may be perforated, but in any event, the sleeve S has a length which is sufficient to cover the perforated portion or section of the pipe P, whether it be the entire pipe or only a part thereof.

After the screen S has been thus positioned on the pipe P and is surrounding the perforated section of the pipe P, the welds W and W-1 are formed at each end of the sleeve S to weld the ends of the sleeve S to the pipe P. Each weld W and W-1 is annular and is sufficiently joined to the end of the wire 17 adjacent thereto so as to completely close off each annular end of the sleeve S so that fluid cannot flow into the ends of the sleeve S. This forces the fluid which is to flow from externally of the sleeve S to the interior of the pipe P to pass through the spaces between the wire 17 to thus prevent sand or other solids from entering with the liquid or gas passing into the interior of the pipe P.

It is to be noted that each of the welds W and W-1 has an external diameter which is not greater than the external diameter of the screen S so that the well screen A may be lowered into any space which will receive the screen S. Also, in the event it is necessary to retrieve any stuck portion of the pipe and thus to perform a milling operation on the screen A, the conventional milling tool can cut the upper weld W and then cut the sleeve S since the sleeve S is held at its lower end by the lower weld W-1 during such milling operation.

The welding with the annular welds W and W-1 ties all of the longitudinal wires 15 and the wrapping wire 17 together since the wires 15 and 17 are welded at each crossing point to each other, as previously explained. Thus, the screen S becomes a unitary part of the pipe P and moves therewith under all conditions of tension and torsion.

The foregoing disclosure and description of the invention are illustrative and explanatory thereof, and various changes in the size, shape, and materials as well as in the details of the illustrated construction may be made without departing from the spirit of the invention.

I claim:

1. A method of making a well screen sleeve which is adapted for use in deep wells with a pipe having a perforated section, comprising:

forming a wire screen sleeve unit by wrapping screen wire on a plurality of circumferentially spaced longitudinal rib wires and welding said screen wire to said rib wires in a relationship to provide predetermined fluid passages through the wrapped screen wire;

thereafter, positioning said formed wire screen sleeve unit over a pipe having a perforated section so as to surround said perforated section with said wire screen sleeve unit; and making an annular welded connection between each end of said wire screen sleeve unit and said pipe to block flow of well fluids by the ends of the wire screen sleeve unit and force flow from externally of said wire screen sleeve unit to pass through the predetermined fluid passages formed by the wrapped screen wire.

2. The method set forth in claim 1, wherein:

each of said annular welds is formed with its external diameter not substantially greater than the external diameter of said screen wires.

3. The method set forth in claim 1, including:

screen said wrapping wire helically on said rib wires; and welding said screen wire to said rib wires at each crossing point of said screen wire with said rib wires.

4. The method set forth in claim 1, including:

wrapping said screen wire exteriorly of said rib wire when forming the wire screen sleeve unit.

5. The method set forth in claim 1, including:

securing said wire screen sleeve unit with the pipe when forming the annular welds for preventing rotation of said sleeve unit relative to said pipe at each end of said wire screen sleeve unit.

* * * * *